Dec. 14, 1926.
L. DAVIS
1,611,002
CORN SNAPPING AND HUSKING MECHANISM
Filed July 14, 1925    5 Sheets-Sheet 1
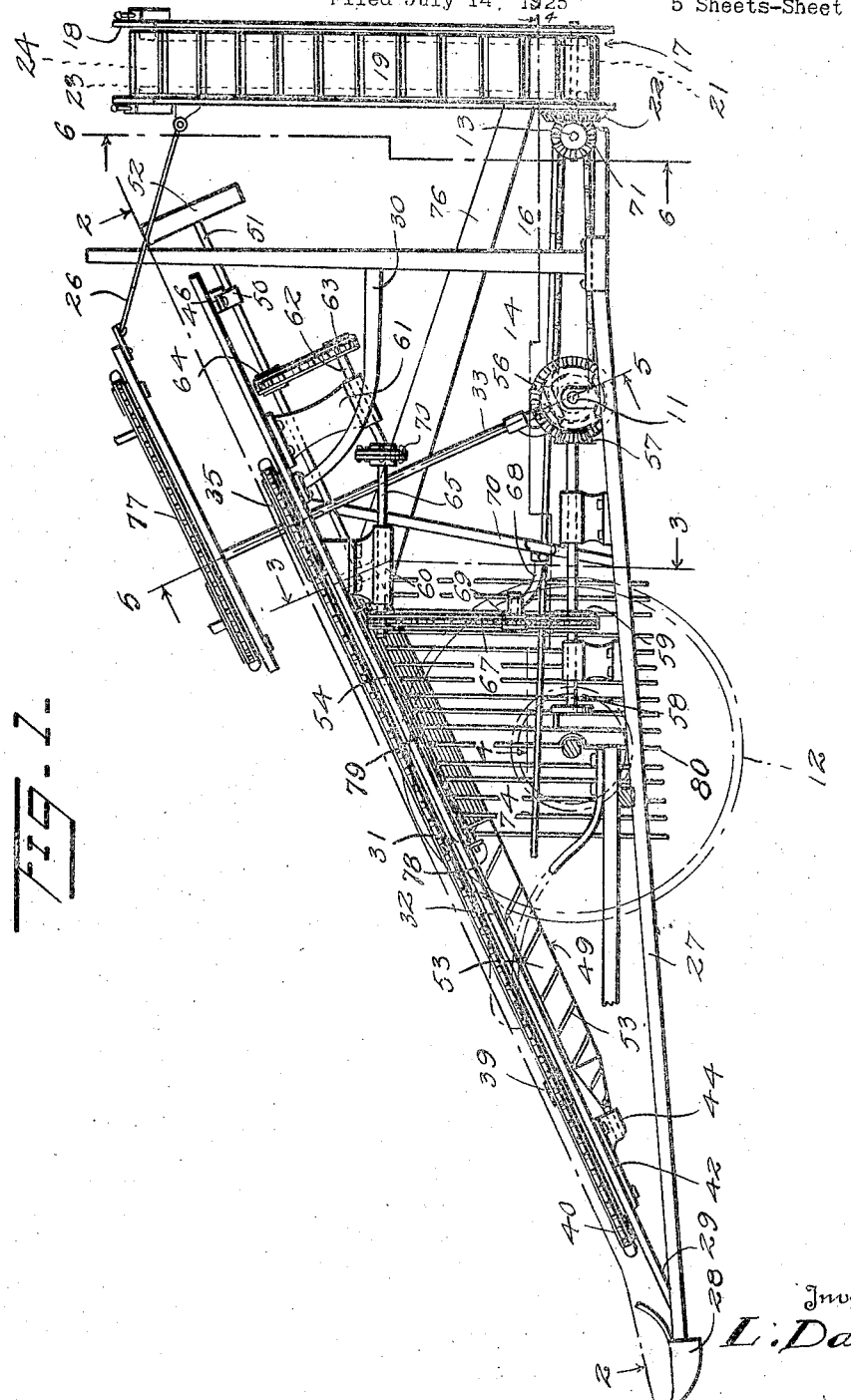
Inventor
L. Davis
By Watson E. Coleman
Attorney Dec. 14, 1926.
L. DAVIS
1,611,002
CORN SNAPPING AND HUSKING MECHANISM
Filed July 14, 1925
5 Sheets-Sheet 2
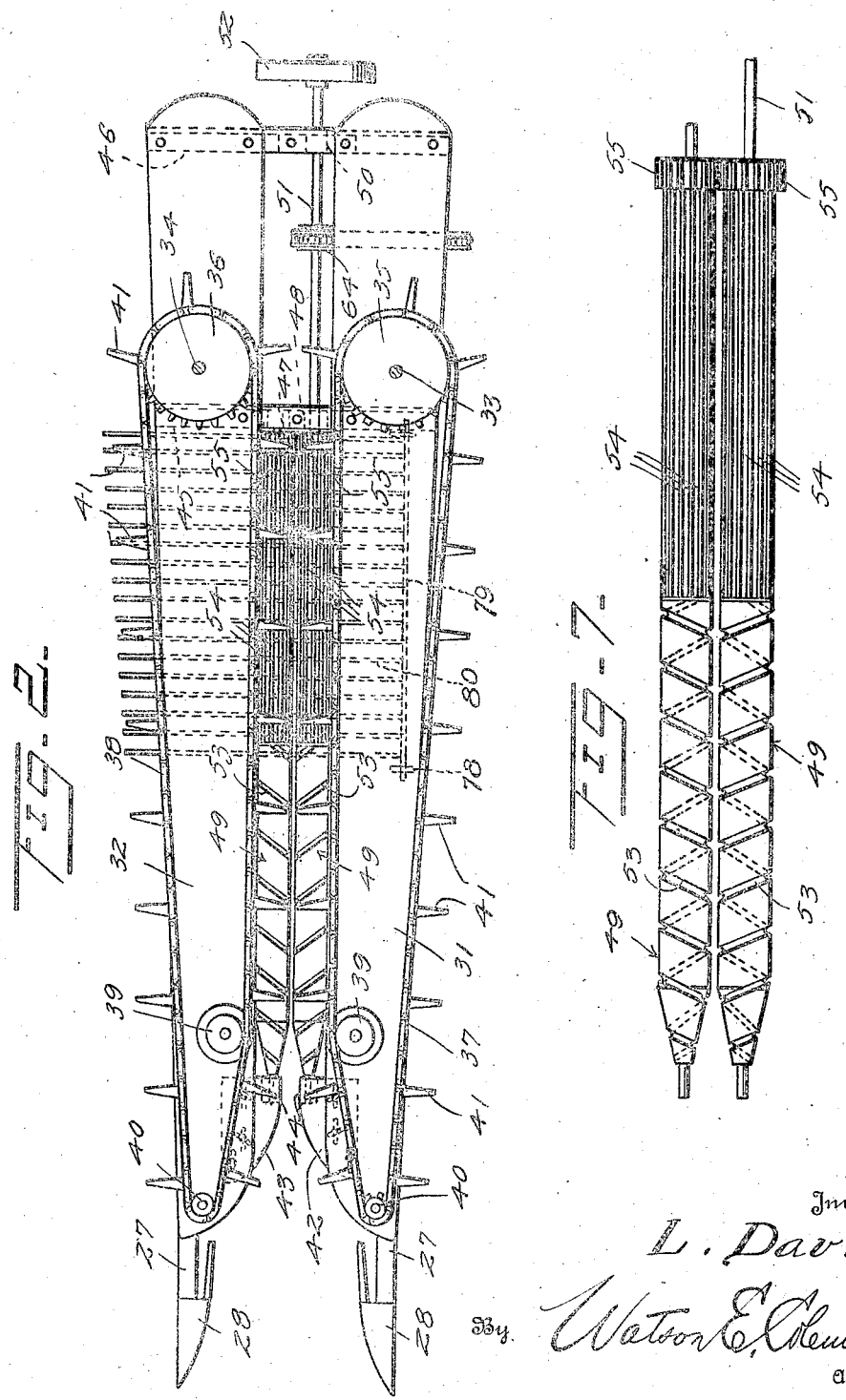
Inventor
L. Davis
By Watson E. Coleman
Attorney Dec. 14, 1926.
L. DAVIS
1,611,002
CORN SNAPPING AND HUSKING MECHANISM
Filed July 14, 1925    5 Sheets-Sheet 3
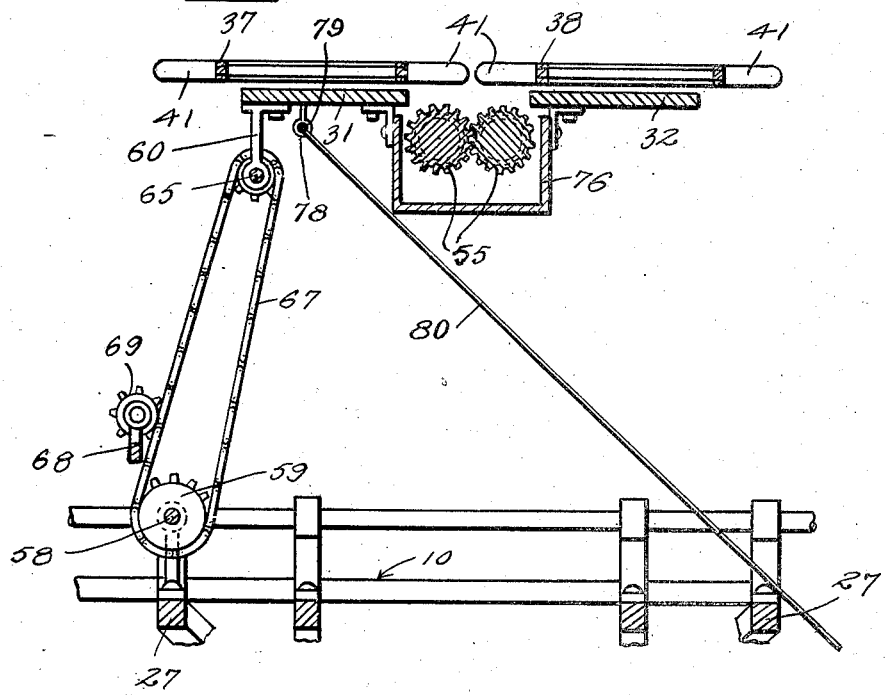
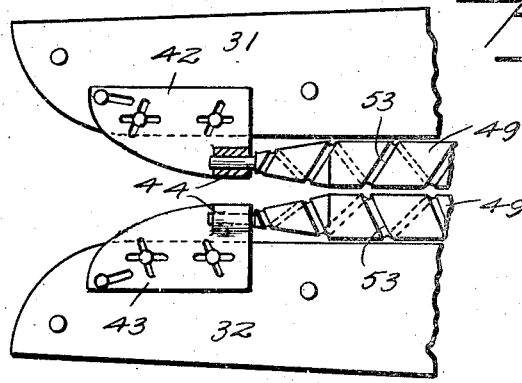
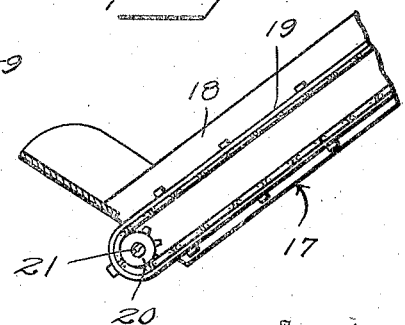
Inventor
L. Davis.
By Watson E. Coleman
Attorney Dec. 14, 1926.
L. DAVIS
1,611,002
CORN SNAPPING AND HUSKING MECHANISM
Filed July 14, 1925     5 Sheets-Sheet 4
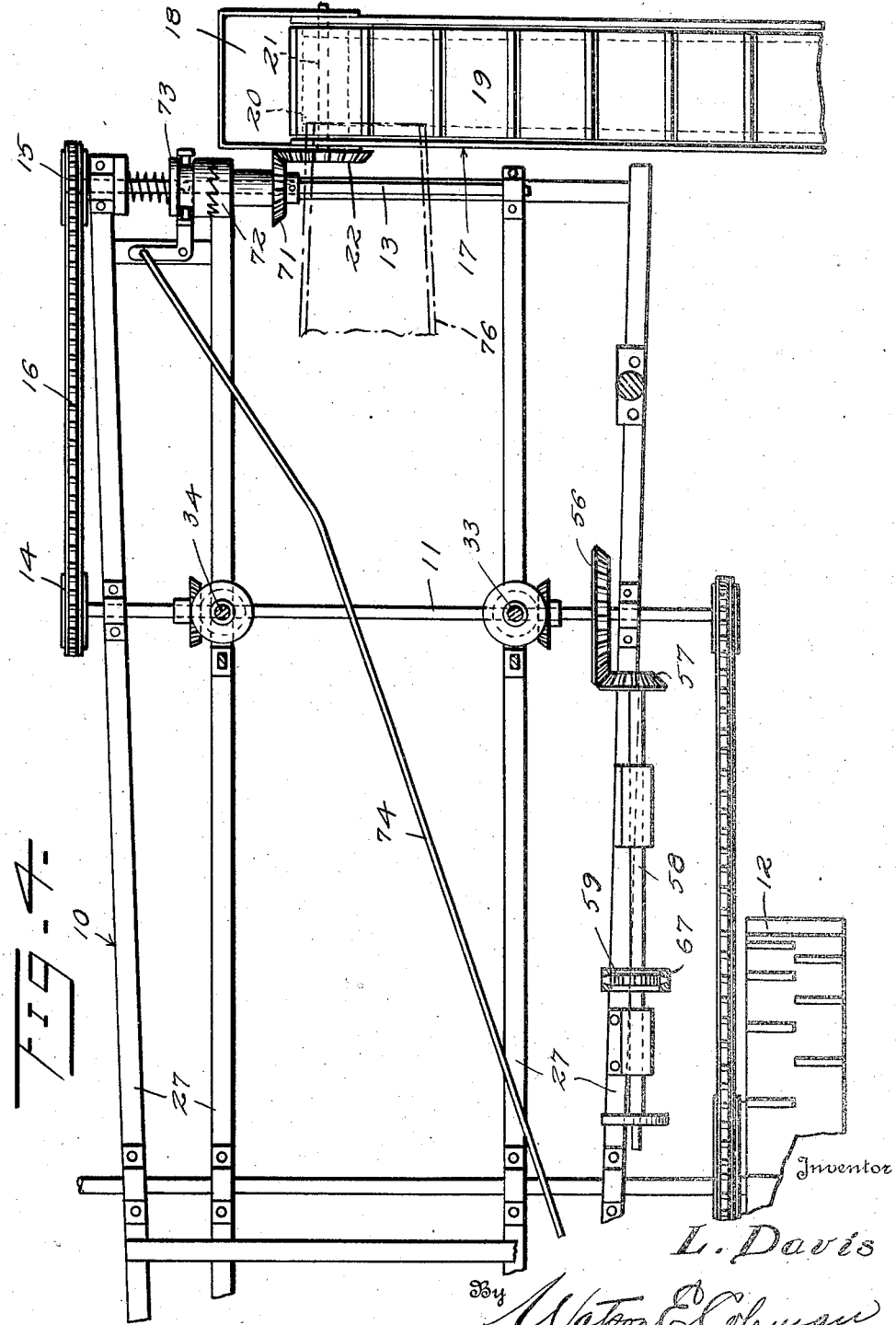

Dec. 14, 1926.
L. DAVIS
1,611,002
CORN SNAPPING AND HUSKING MECHANISM
Filed July 14, 1925    5 Sheets-Sheet 5
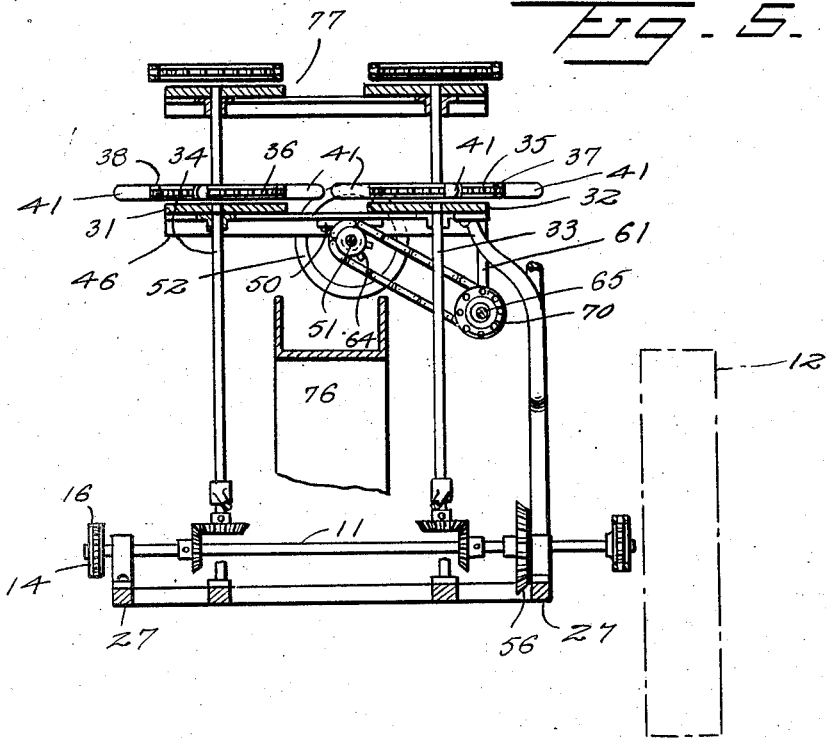
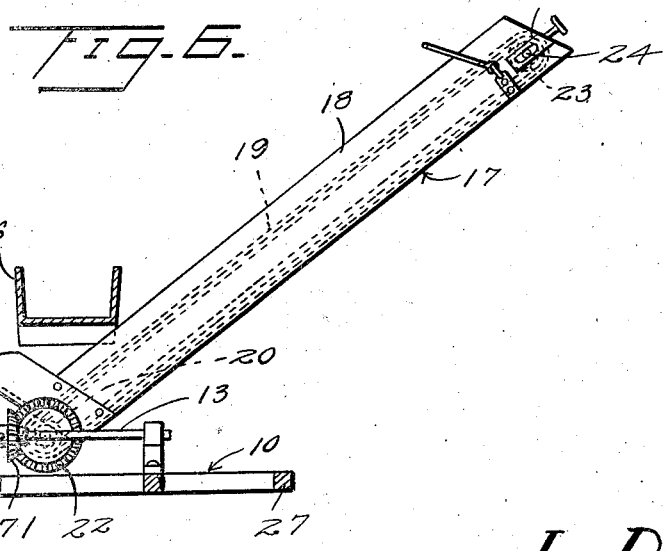
Inventor
L. Davis
By Watson E. Coleman
Attorney Patented Dec. 14, 1926.

1,611,002

UNITED STATES PATENT OFFICE.

LOUIE DAVIS, OF ROCKHAM, SOUTH DAKOTA.

CORN SNAPPING AND HUSKING MECHANISM.

Application filed July 14, 1925. Serial No. 43,564.

This invention relates to corn snapping and husking mechanism and more particularly to a portable structure adapted to snap and husk the corn in the field without removing the stalks from the ground.

An important object of the invention is to provide a device of this character in the nature of an attachment for a well known form of corn binding mechanism so that by removing certain portions of the corn binder and applying other devices, the device may be employed for snapping and husking.

A further object of the invention is to provide corn snapping and husking mechanism including a single pair of rollers performing both functions.

A further and more specific object of the invention is to provide a device of this character having a pair of upwardly and rearwardly inclining rollers and means for driving the same together with means for feeding between the rollers the stalks of corn bearing the ears, this means being subsequently employed after the rollers have acted to separate the ears from the stalks to cause the ears to travel longitudinally of the rollers to be husked thereby.

The invention further lies in the details of construction, hereinafter set forth and illustrated in the accompanying drawings, wherein:—

Figure 1 is a side elevation of a portable corn snapping and husking machine constructed in accordance with my invention;

Figure 2 is a section on the line 2—2 of Figure 1;

Figure 3 is a section on the line 3—3 of Figure 1;

Figure 4 is a section on the line 4—4 of Figure 1;

Figure 5 is a section on the line 5—5 of Figure 1;

Figure 6 is a section on the line 6—6 of Figure 1;

Figure 7 is an enlarged plan view of the snapping and husking roller;

Figure 8 is an enlarged plan view showing the mounting of the lower ends of the roller; and Figure 9 is a detailed sectional view showing the mounting of the conveyor mechanism.

Referring now more particularly to the drawings, the numeral 10 indicates a wheel supported frame having adjacent its rear end a transversely extending shaft 11 driven from one of the wheels 12 of the frame. At its rear end, the frame is provided with a second transversely extending shaft 13 having a sprocket and chain connection with the shaft 11 including a sprocket 14 on the shaft 11 and a sprocket 15 upon the shaft 13 and a chain 16 connecting the same.

Riveted upon the rear end of the frame is an elevator structure 17 including a chute 18 and an endless belt traveling within the chute, as at 19. This belt passes about a sprocket 20 mounted upon a shaft 21 forming the pivot of the chute and having secured thereto exteriorly of the chute a bevel gear 22. At its opposite end, the chain passes over a second sprocket 23 mounted upon a shaft 24 adjustable in the chute 19, as at 25. The angle of the chute with relation to the frame is adjusted by flexible elements 26 connecting the upper end of the chute with a stationary element supported from the frame 10. Extending forwardly from the frame 10 are a pair of extension or horns 27 having their forward ends spaced and provided with skid shoes 28 adapted to guide between the horns 27 the stalks of corn upon which the machine is to act. Secured at their forward ends to these horns 27 adjacent the forward ends of the horns and supported at their rear ends from the shoes 27, as at 29, and at their ends from the frame 10, as at 30, are a pair of spaced frame boards 31 and 32. The rear support of these boards is of considerable length so that the boards incline upwardly and rearwardly and adjacent edges of these boards are spaced from one another. Adjacent the rear ends of the boards, driving shafts 33 and 34 project therethrough, these shafts receiving their power from the transverse shaft 11. The upper ends of the shafts 33 and 34 have secured thereto sprockets 35 and 36 about which pass chains 37, 38, the forward ends of which pass over idler rollers 39 and sprockets 40 carried by their respective boards. These chains operate upon the upper surface of the boards and are provided with outstanding flight elements 41 adapted to engage a corn stalk to cause the same to move rearwardly between the boards.

Secured to the under surface of the boards adjacent the forward ends thereof are a pair of shoes 42, 43, each shoe being provided at its inner edge or that edge most nearly adjacent the other of the shoes with a rearwardly directed socket 44. Secured to the boards 31 and 32 adjacent the rear or upper ends thereof are a pair of spaced supports 45 and 46. The support 45 which is arranged most nearly adjacent the forward ends of the boards has mounted thereon a pair of bearings 47 and 48 and in these bearings 47 and 48 are mounted the rear ends of rollers 49, the forward ends of which are journaled in the sockets 44 of the shoes. The support 46 has a single bearing 50 aligning with the bearing 47 and receiving an extension 51 of the roller 49 associated with the bearing 47. The rear end of this extension has secured thereto a fly or governor wheel 52, the purpose of which will presently appear.

Each roller 49 has its lower end portion formed with a spirally extending groove 53 and its upper end portion provided with a plurality of longitudinally extending circumferentially spaced grooves 54. The upper ends of the rollers are provided with gears 55 which mesh so that these rollers will rotate in opposite directions. The direction of rotation of the rollers is such that their adjacent faces move downwardly during this rotation.

Secured to the shaft 11 is a gear 56 which meshes with a gear 57 carried by the longitudinally extending shaft 58 mounted upon the frame 10. To the shaft is secured a sprocket 59. Secured to the under surface of the board 31 are a pair of spaced bearings 60, 61, the bearing 60 paralleling the shaft 58 while the bearing 61 parallels the extension 51 of the roller engaged in the bearing 47. Directed through the bearing 61 is a short shaft section 62 having secured thereto a sprocket 63 aligning with the sprocket 64 secured to the extension 51 between the bearing supports 45 and 46. Mounted in the bearing 60 is a shaft 65 having secured thereto a sprocket 66 connected with the sprocket 59 by a chain 67. Mounted upon a support extending upwardly from the frame and indicated at 68 is an idler roller 69 engaging the sprocket chain 67 to hold the same under proper tension. Adjacent ends of the shaft 62 and 65 are connected by a universal coupling 70.

Upon the shaft 13 is mounted a gear 71 meshing with the gear 22 of the chute conveyor mechanism. This gear has its hub 72 in the form of one member of a jaw clutch and the opposite member 73 of which is normally spring-pressed for engagement with the member 72 and is held out of engagement by suitable control mechanism 74 operated from the point adjacent the driver's seat 75 of the machine. A chute 76 has its upper end arranged beneath the upper ends of the roller 49 and its lower end discharging into the chute 18 to discharge corn from the rollers to this chute.

Removably secured to the under surface of the left hand board 31 by means of eyes 78 is a bar 79 having secured thereto a plurality of fingers 80 inclining downwardly and outwardly and resting upon the framework 27 at the right hand side of the machine. These fingers pass beneath the husking portions 54 of the rollers 49 to receive husks stripped from the corn and discharge them to one side of the frame.

In the operation of the device, the machine is driven down the corn rows so that the stalks of corn pass between the horns 27. Passing between these horns, the stalks are engaged by the flights 41 and moved into position between the rollers 49, these rollers finally engaging the ear and snapping the same from the stalk. The flights operate immediately over the upper faces of the rollers, as more clearly shown in Figure 3 so that they engage against an ear of corn lying upon the rollers and cause the same to travel upwardly. Arriving at the longitudinally grooved sections of the rollers, the husks of the ears are caught by the roughened surfaces thus provided and drawn from the ear, the husked ear finally passing over the upper end of the rollers and dropping into the chute 76, the husk falling upon the fingers 80 and being discharged at the right hand side of the machine. By this chute 76, the husked ears are conducted to the conveyor mechanism 19 by means of which it may be delivered to a wagon traveling alongside of the machine. The heavy fly wheel 52 at the upper end of the extension 51 provides against jerky operation of the rollers as in overcoming the passage of the stub from an ear of corn.

Attention is directed to the fact that of the mechanism above described, the shafts 11 and 52, the entire framework including the horns 27, the boards 31 and 32, the flight chains and their driving mechanism are all normal portions of a well known type of corn binding mechanism. This corn binding mechanism has associated therewith other conveyor mechanisms which are herein illustrated at 77 and which, in adding my mechanism to the corn binder, need not be removed. As a matter of fact, but few of the standard parts of the corn binder are removed, these parts including the usual knife for severing the corn, the bundle carrier and a portion of one of the packer mechanisms.

Of the mechanism above described, the conveyor mechanism 17, rollers 49 and their upper end bearing mountings, chutes 76 and corn husk conveyor mechanism are all removably attached to the machine so that they may be removed, the missing portions of the corn binding mechanism restored to their proper positions and the device used as a corn binder. In using the device as a corn husker, the corn stalks are not removed from the ground and may be removed later by the binding mechanism.

It will, of course, be obvious that the construction hereinbefore set forth is capable of a certain range of change and modification without materially departing from the spirit of my invention and I accordingly do not limit myself to such specific structure except as hereinafter claimed.

I claim:

1. The combination with a corn harvester including a wheel supported frame, a pair of guiding horns projecting forwardly from the frame, a pair of upwardly and rearwardly inclining spaced boards extending from said horns rearwardly over the frame, sprocket and chain conveyors mounted upon the upper surface of and supported by each board and including flight elements projecting outwardly into the space between the boards and a drive for said conveyor chains, of removable shoes secured to the under surface of said boards adjacent the lower ends thereof and projecting into the space between the boards, brackets removably secured to the under surface of the boards adjacent the upper ends thereof, a pair of rollers journaled in said brackets and shoes and each including a snapping and a husking section and means for driving said rollers from the drive of said chains, the flights of said chains operating immediately above the upper surface of said rollers, said brackets and shoes being removable from the boards independently of the conveyor mechanism to thereby permit independent use of the conveyor mechanism.

2. The combination with a corn harvester including a wheel supported frame, a pair of guiding horns projecting forwardly from the frame, a pair of upwardly and rearwardly inclining spaced boards extending from said horns rearwardly over the frame, sprocket and chain conveyors mounted upon the upper surface of and supported by each board and including flight elements projecting outwardly into the space between the boards and a drive for said conveyor chains, of removable shoes secured to the under surface of said boards adjacent the lower ends thereof and projecting into the space between the boards, brackets removably semovably secured to the under surface of the boards adjacent the upper ends thereof, a pair of rollers journaled in said brackets and shoes and each including a snapping and a husking section and means for driving said rollers from the drive of said chains, the flights of said chains operating immediately above the upper surface of said rollers, said brackets and shoes being removable from the boards independently of the conveyor mechanism to thereby permit independent use of the conveyor mechanism, adjacent faces of the shoes merging with the front faces of the shoes to provide surfaces for directing material engaging the shoes between the shoes between the shoes and the rollers mounted therein.

In testimony whereof I hereunto affix my signature.

LOUIE DAVIS.